United States Patent
Nakano

(10) Patent No.: US 12,250,353 B2
(45) Date of Patent: Mar. 11, 2025

(54) IMAGE PROCESSING APPARATUS THAT REQUESTS COLLECTION OF CONSUMABLE, CONTROLLING METHOD AND STORAGE MEDIUM THEREFOR

(71) Applicant: CANON KABUSHIKI KAISHA, Tokyo (JP)

(72) Inventor: Kyosuke Nakano, Chiba (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 18/349,472

(22) Filed: Jul. 10, 2023

(65) Prior Publication Data

US 2024/0031502 A1  Jan. 25, 2024

(30) Foreign Application Priority Data

Jul. 21, 2022  (JP) .................................. 2022-116288

(51) Int. Cl.
*H04N 1/32* (2006.01)
*G06K 15/02* (2006.01)
*H04N 1/00* (2006.01)

(52) U.S. Cl.
CPC ..... *H04N 1/32096* (2013.01); *G06K 15/1823* (2013.01); *H04N 1/0044* (2013.01)

(58) Field of Classification Search
CPC ............. H04N 1/32096; H04N 1/0044; G06K 15/1823; G06F 3/1208; G06F 3/1218; G06F 3/1219; G06F 3/1235
See application file for complete search history.

(56) References Cited

U.S. PATENT DOCUMENTS

| 2002/0002492 A1* | 1/2002 | Okazawa | ........... G06Q 30/0235 |
| | | | 705/14.35 |
| 2002/0073148 A1* | 6/2002 | Haines | ................. G06Q 10/087 |
| | | | 709/204 |

(Continued)

FOREIGN PATENT DOCUMENTS

JP  2018004779 A  1/2018

OTHER PUBLICATIONS

English Machine Translation of JP 2004-013611-A (Itazawa et al., Published Jan. 15, 2004) (Year: 2004).*

(Continued)

*Primary Examiner* — Juan M Guillermety
(74) *Attorney, Agent, or Firm* — Rossi, Kimms & McDowell LLP

(57) ABSTRACT

An information processing apparatus capable of requesting collection of a consumable without complicated work. The information processing apparatus determines whether or not collection of a consumable is necessary, acquires, in a case where it is determined that the collection of the consumable is necessary, user information as information necessary for a collection request of the consumable, causes a display part to display an input screen in which the acquired user information is reflected, receives edit of the information necessary for the collection request of the consumable from a user on the input screen, and generates a request image for the collection request of the consumable, from the received information necessary for the collection request of the consumable and a format image for the collection request, and transmit the generated request image to a designated destination.

19 Claims, 12 Drawing Sheets

(56) References Cited

U.S. PATENT DOCUMENTS

| | | | | |
|---|---|---|---|---|
| 2008/0267642 A1* | 10/2008 | Hadano | .............. | G03G 15/5079 |
| | | | | 399/27 |
| 2017/0161719 A1* | 6/2017 | Bhatia | ................... | G06F 3/1219 |
| 2017/0346982 A1* | 11/2017 | Yamada | ............. | H04N 1/32539 |
| 2018/0349835 A1* | 12/2018 | Ishida | .................. | G06Q 10/087 |
| 2020/0225885 A1* | 7/2020 | Akimoto | ............... | G06F 3/1219 |
| 2023/0138618 A1* | 5/2023 | Harada | ................... | G06F 3/121 |
| | | | | 358/1.15 |

OTHER PUBLICATIONS

English Machine Translation of JP 2010-182178-A (Mizusawa, Published Aug. 2010) (Year: 2010).*

* cited by examiner

TONER CARTRIDGE COLLECTION

DO YOU WANT TO REQUEST COLLECTION — 803
WITH FOLLOWING INFORMATION?

| COMPANY NAME* | XXX CO., LTD. |
| DEPARTMENT NAME* | YYY DEPARTMENT ZZZ SECTION |
| NAME* | ZZZ TARO |
| ... | ... |
| DESIRED DATE OF COLLECTION* | 2022/3/14 |

804

OK   EDIT   CANCEL 805  806  807

*FIG. 9*

| | USED TONER CARTRIDGE COLLECTION REQUEST FORM | |
|---|---|---|
| 903 | COMPANY NAME | 904 |
| | DEPARTMENT NAME | |
| | NAME OF PERSON IN CHARGE | Mr./Ms. |
| | TELEPHONE NUMBER | |
| | FAX NUMBER | |
| | ADDRESS | ZIP CODE □□□-□□□□ |
| 905 | DESIRED DATE OF COLLECTION | YYYY/MM/DD — 906 |
| 907 | NUMBER OF USED TONER CARTRIDGES | TOTAL: — 908 |

| | | |
|---|---|---|
| | USED TONER CARTRIDGE COLLECTION REQUEST FORM | |
| | COMPANY NAME | XXX CO., LTD. |
| | DEPARTMENT NAME | YYY DEPARTMENT ZZZ SECTION |
| | NAME OF PERSON IN CHARGE | Mr./Ms. ZZZ TARO |
| | TELEPHONE NUMBER | PPP-PPPP-PPPP |
| | FAX NUMBER | FFF-FFFF-FFFF |
| | ADDRESS | ZIP CODE N N N - N N N N |
| | | TOKYO    OTA-KU |
| | | AAA BBBBBB |
| | DESIRED DATE OF COLLECTION | 2022/3/31 |
| | NUMBER OF USED TONER CARTRIDGES | TOTAL:    6 |

# IMAGE PROCESSING APPARATUS THAT REQUESTS COLLECTION OF CONSUMABLE, CONTROLLING METHOD AND STORAGE MEDIUM THEREFOR

BACKGROUND OF THE INVENTION

Field of the Invention

The present invention relates to an information processing apparatus that requests collection of a consumable, a controlling method and a storage medium therefor.

Description of the Related Art

Conventionally, a consumable has been used in an information processing apparatus. For example, in an image processing apparatus as an information processing apparatus, a consumable such as a toner cartridge is used. Conventionally, when a consumable is used due to toner consumption or the like, a user requests a dealer to collect the used consumable.

Japanese Laid-Open Patent Publication (kokai) No. 2018-4779 discloses a technique in which a management apparatus capable of cooperating with an image processing apparatus and a carrier manages an inventory status of a consumable, determines whether or not ordering and collection of the consumable are necessary depending on a usage status of the consumable, and requests the carrier to collect the consumable as necessary.

However, by the technique disclosed in Japanese Laid-Open Patent Publication (kokai) No. 2018-4779, in an environment where a request destination of collection of a consumable and a user side of the consumable cannot share an inventory status of the consumable, the user side cannot request collection of the consumable. In addition, as in the related art, in the case of using a method in which a user describes necessary items on a paper sheet on which an image for collection request is printed and transmits the filled paper sheet via FAX, or using a method in which a collection request form is filled in from a WEB site for collection request and collection is requested, a lot of manual labor is required.

SUMMARY OF THE INVENTION

The present invention provides an information processing apparatus capable of requesting collection of a consumable without complicated work, a controlling method and a storage medium therefor.

Accordingly, the present invention provides an information processing apparatus comprising at least one memory that stores a set of instructions, and at least one processor that executes the instructions, the instructions, when being executed, causing the information processing apparatus to determine whether or not collection of a consumable is necessary, acquire, in a case where it is determined that the collection of the consumable is necessary, user information as information necessary for a collection request of the consumable, cause a display part to display an input screen in which the acquired user information is reflected, receive edit of the information necessary for the collection request of the consumable from a user on the input screen, and generate a request image for the collection request of the consumable, from the received information necessary for the collection request of the consumable and a format image for the collection request, and transmit the generated request image to a designated destination.

According to the present invention, it is possible to request collection of a consumable without complicated work.

Further features of the present invention will become apparent from the following description of exemplary embodiments with reference to the attached drawings.

BRIEF DESCRIPTION OF THE DRAWINGS

FIG. 8 is a diagram showing an example of a confirmation screen.

FIG. 9 is a diagram showing an example of a format image for collection request.

FIG. 10 is a diagram showing an example of a request image.

DESCRIPTION OF THE EMBODIMENTS

The present invention will now be described in detail below with reference to the accompanying drawings showing embodiments thereof.

Figure 1:
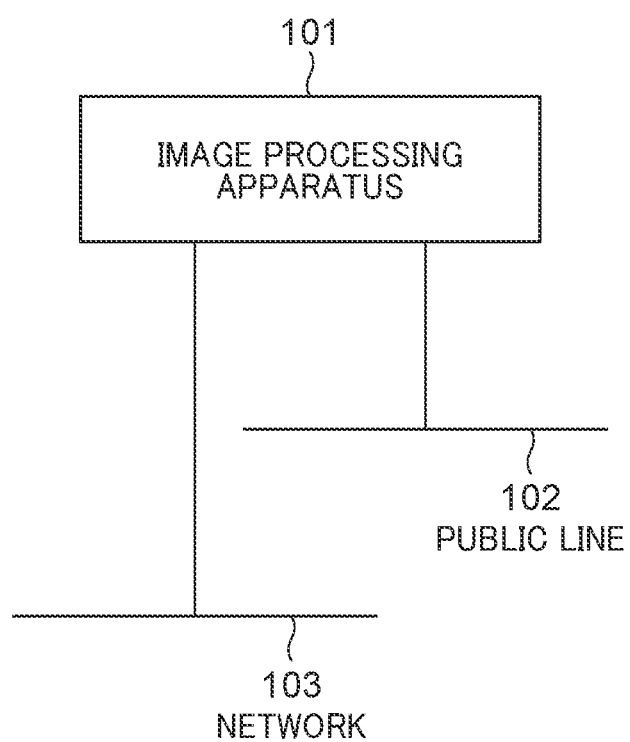
FIG. 1 is a configuration diagram of an information processing system including an information processing apparatus according to a first embodiment of the present invention.

FIG. 1 is a configuration diagram of an information processing system including an information processing apparatus according to a first embodiment of the present invention. An image processing apparatus 101, which is an example of the information processing apparatus, has a function of transmitting and receiving a facsimile (FAX) via a public line 102 and a function of transmitting and receiving data to and from a server via a network 103, and is configure to transmit and receive image data. It should be noted that the configuration of the network 103 only needs to be a configuration capable of transmitting image data, and may be a configuration wirelessly connected to an access point (not shown).

Figure 2:
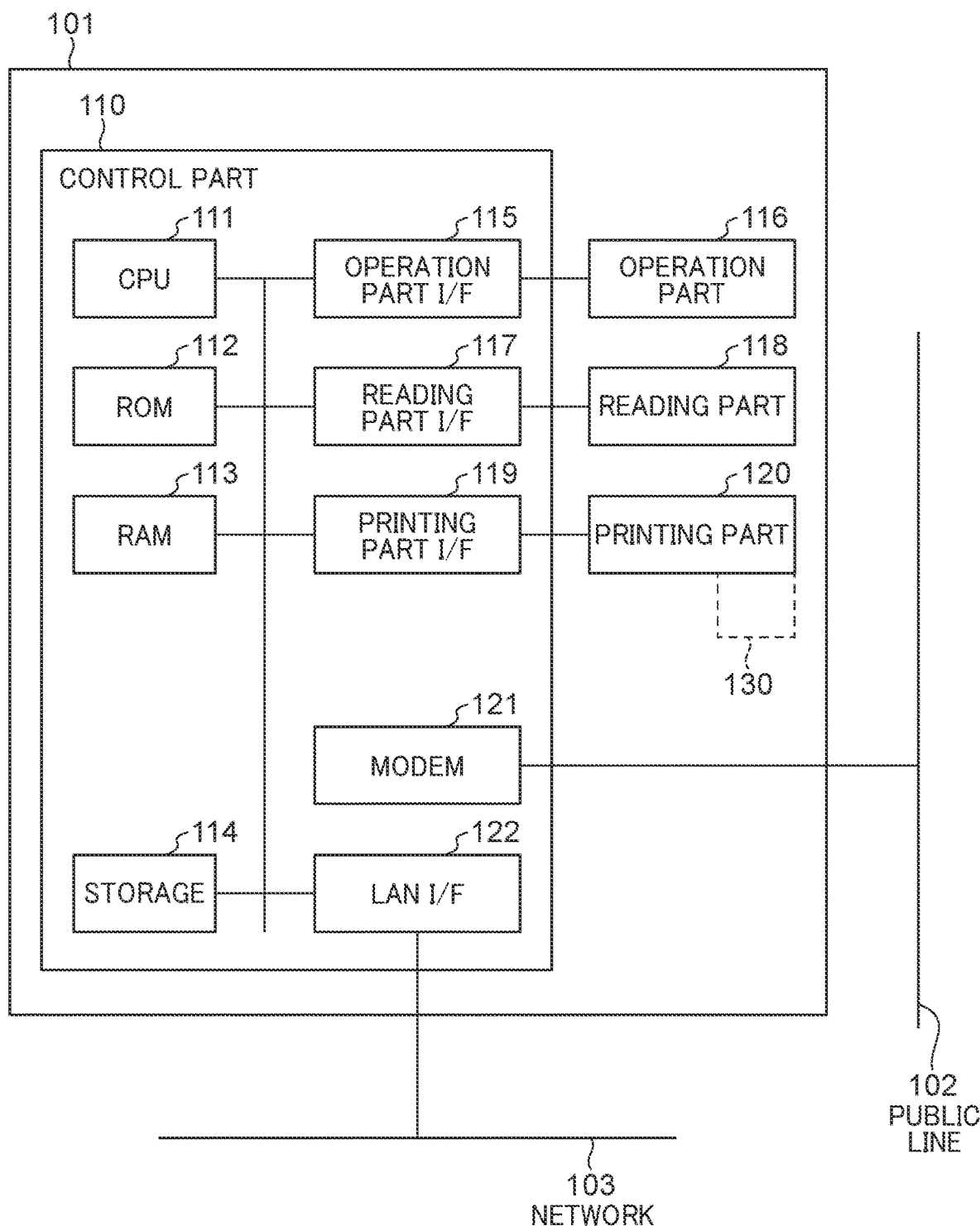
FIG. 2 is a block diagram showing a configuration of an image processing apparatus.

FIG. 2 is a block diagram showing a configuration of the image processing apparatus 101. Hereinafter, the image processing apparatus 101 is referred to as an MFP 101.

The MFP 101 includes a control part 110, an operation part 116, a reading part 118, and a printing part 120. The control part 110 includes a CPU 111 and controls the overall operation of the MFP 101. The CPU 111 reads a control program stored in a ROM 112 or a storage 114, and performs various types of control such as reading control, printing control, and communication control. The ROM 112 stores the control program executed by the CPU 111. The ROM 112 further stores a boot program, font data, and the like. A RAM 113 is a main storage memory of the CPU 111, and is used as a work area and a temporary storage area for loading various control programs stored in the ROM 112 and the storage 114. The storage 114 stores image data, printing data, an address book, a shortcut, various programs, and various setting information. A flash memory is assumed as the storage 114; however, an auxiliary storage device such as an SSD, an HDD, or an eMMC may be used as the storage 114.

In the MFP 101, one CPU 111 executes each processing shown in a flowchart to be described later using one memory (RAM 113). However, other modes may be adopted. For example, a plurality of CPUs, RAMs, ROMs, and storages can cooperate to execute each processing shown in the flowchart described later. In addition, some processing may be executed using a hardware circuit such as an application specific integrated circuit (ASIC) or a field-programmable gate array (FPGA).

An operation part I/F 115 connects the operation part 116 and the control part 110 to each other, wherein I/F means an interface. The operation part 116 has a function as a display part that displays information to a user, and has a function of receiving an input from the user. A reading part I/F 117 connects the reading part 118 and the control part 110 to each other. The reading part 118 reads an image on a document and converts the image into image data such as binary data. The image data generated by the reading part 118 is transmitted to an external device, saved in an external recording device, or printed on recording paper.

A printing part I/F 119 connects the printing part 120 and the control part 110 to each other. The CPU 111 transfers image data to be printed (image data of printing target) to the printing part 120 via the printing part I/F 119. The printing part 120 prints an image on recording paper fed from a paper feed cassette (not shown) using toner supplied from a toner cartridge 130. Here, the toner cartridge 130 is an example of a consumable used in the image processing apparatus 101, and contains toner. The number of toner cartridges 130 is not limited, and may be one or more.

A MODEM 121 transmits image data by FAX to an external FAX receiver via the public line 102. A LAN I/F 122 is connected to an external server via the network 103 and transmits image data.

Figure 3:
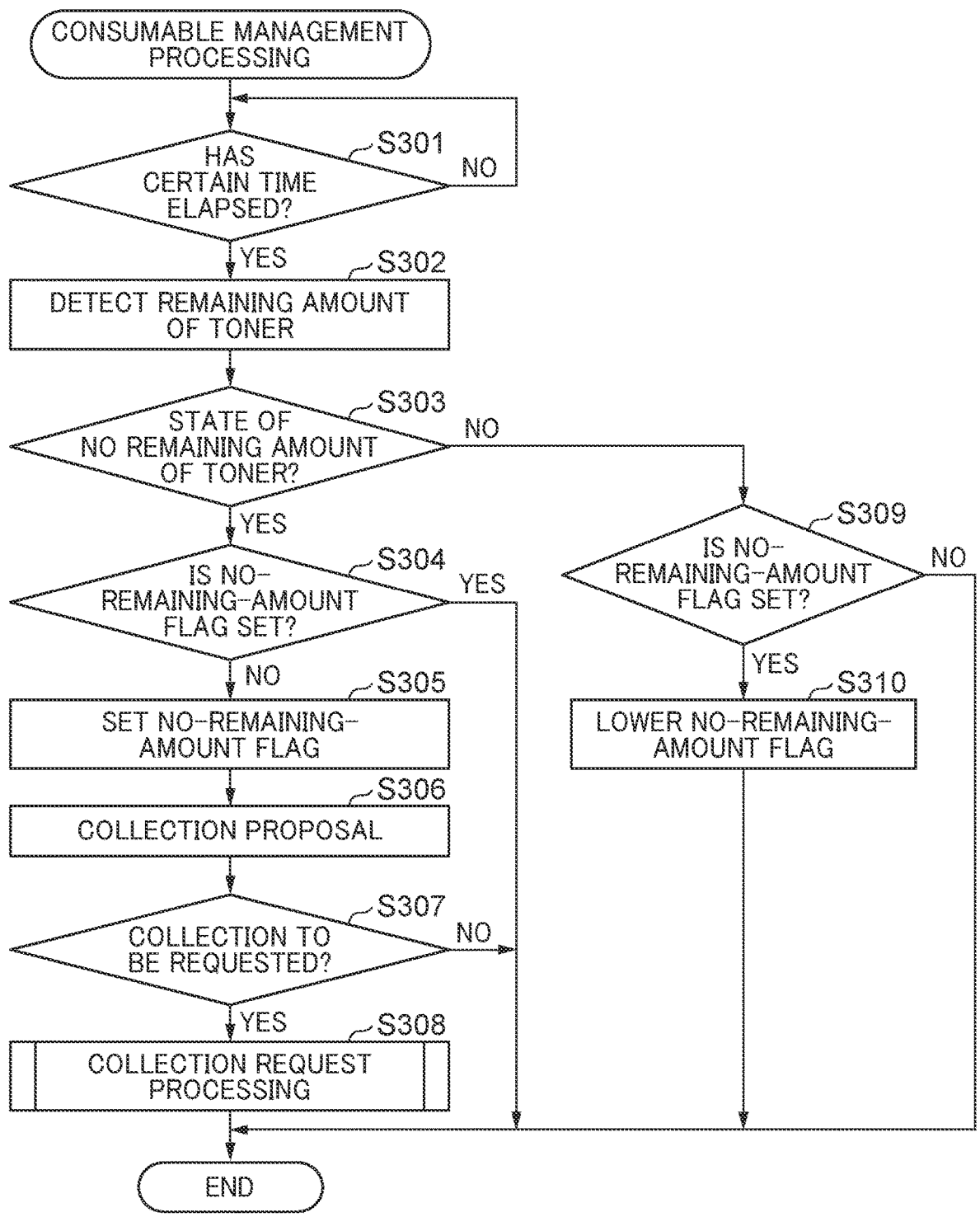
FIG. 3 is a flowchart showing consumable management processing.

FIG. 3 is a flowchart showing consumable management processing. This processing is implemented by allowing the CPU 111 to load a program stored in the ROM 112 or the like in the RAM 113 and executing the program. The consumable management processing is started when the image processing apparatus 101 is started. Alternatively, the consumable management processing may be started by a start instruction from a user after the image processing apparatus 101 is started.

This processing will be outlined. The CPU 111 proposes, to the user, implementation of a consumable collection request according to the consumption state of a consumable, and performs collection request processing when an instruction to perform collection is given from the user. In step S308, collection request processing (FIG. 4) is executed as a subroutine. The toner cartridge 130 is exemplified as a consumable.

In step S301, the CPU 111 waits until a certain time elapses from the start of the present processing. Here, the certain time is a predetermined fixed value and is stored in the ROM 112 or the like. Alternatively, a certain time may be set by the user as the setting of the MFP 101.

In step S302, the CPU 111 detects a remaining amount of toner contained in the toner cartridge 130 and stores the detection result in the RAM 113. It should be noted that, in a case where there is a plurality of toner cartridges 130, the remaining amount of toner in each toner cartridge 130 is detected, and each detection result is stored. A known method can be adopted regardless of the method for detecting the remaining amount of the toner. For example, the remaining amount of toner is calculated from the amount of toner of a brand-new toner cartridge 130 and a toner supply amount from the toner cartridge 130 to an image forming part (not shown).

In step S303, the CPU 111 reads the remaining amount of toner stored in the RAM 113 in step S302, and determines whether or not the toner cartridge 130 is in the state of "no remaining amount of toner". At this time, in a case where the remaining amount of toner contained in the toner cartridge 130 is below a predetermined value, the CPU 111 determines that the toner cartridge 130 is in the state of "no remaining amount of toner". The fact that the toner cartridge 130 is in the state of "no remaining amount of toner" means that the toner cartridge 130 is used and consumed. It should be noted that the predetermined value is 0 or a value greater than 0, and is stored in the ROM 112 or the like in advance.

The CPU 111 proceeds the processing to step S304 in a case where the toner cartridge 130 is in the state of "no remaining amount of toner", and proceeds the processing to step S309 in a case where the toner cartridge 130 is not in the state of "no remaining amount of toner". It should be noted that, in the case of a configuration in which a plurality of the toner cartridges 130 is present, the CPU 111 proceeds the processing to step S304 in a case where at least one toner cartridge 130 is in the state of "no remaining amount of toner".

In step S304, the CPU 111 determines whether or not "no-remaining-amount flag" stored in the RAM 113 is set (is set to "1"). Setting the no-remaining-amount flag to "1" indicates that the toner cartridge 130 is in the state of "no remaining amount of toner". Setting the no-remaining-amount flag to "0" indicates that the toner cartridge 130 is not in the state of "no remaining amount of toner". It should be noted that, in the case of the above-mentioned configuration in which the plurality of the toner cartridges 130 are present, setting the no-remaining-amount flag to "1" indicates that at least one toner cartridge 130 is in the state of "no remaining amount of toner".

As a result of the determination in step S304, in a case where the no-remaining-amount flag is set in the RAM 113 (is set to "1"), the CPU 111 ends the processing shown in FIG. 3, and in a case where the no-remaining-amount flag is not set in the RAM 113 (is set to "0"), the processing proceeds to step S305. In step S305, the CPU 111 sets the no-remaining-amount flag (sets to "1").

In step S306, the CPU 111 executes collection proposal.

Figure 5:
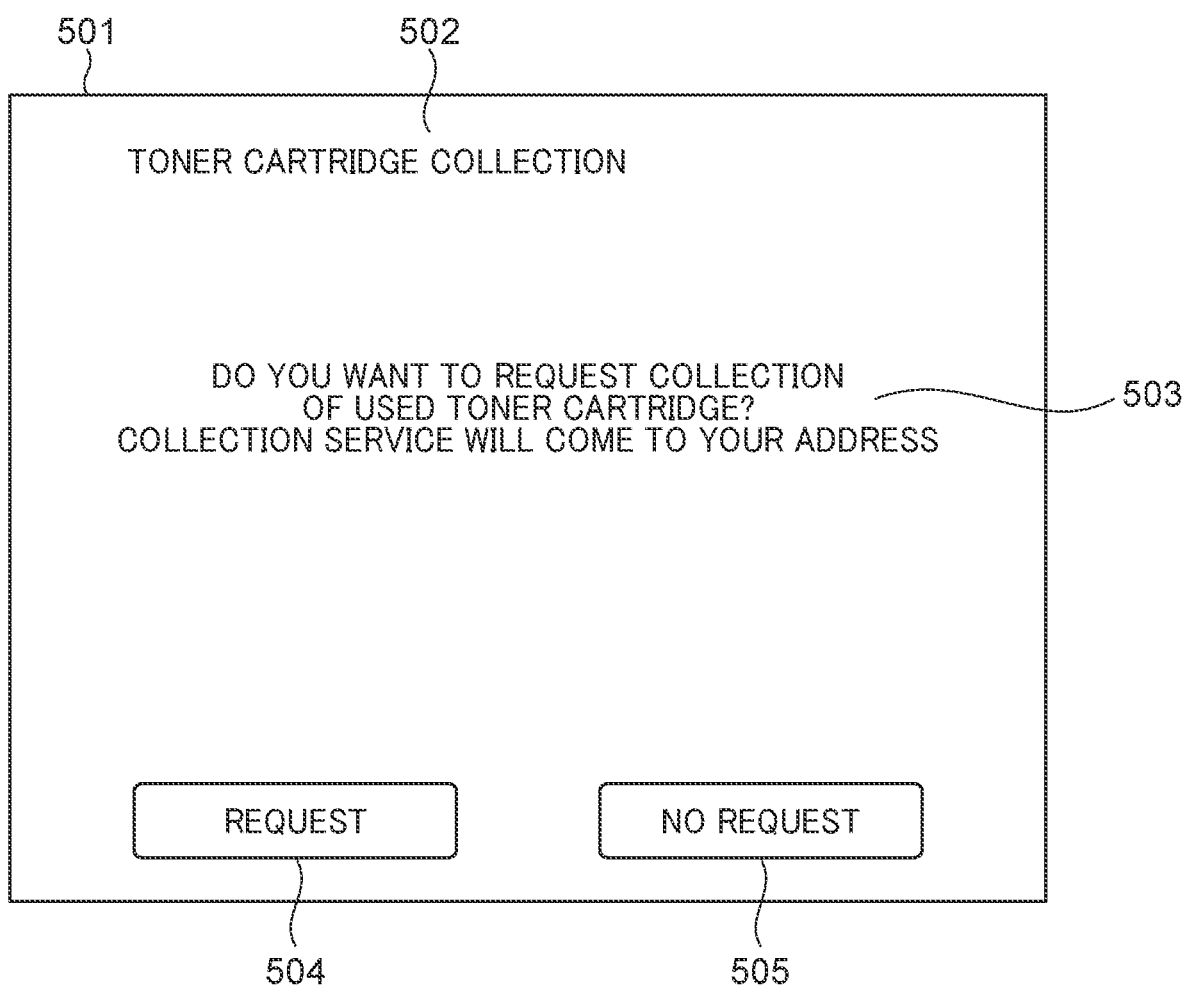
FIG. 5 is a diagram showing an example of a collection proposal screen (inquiry screen).

FIG. 5 is a diagram showing an example of a collection proposal screen (inquiry screen) 501. In the collection proposal, the CPU 111 displays the collection proposal screen 501 on (the display part of) the operation part 116. On the collection proposal screen 501, a display 502 indicates that the collection proposal screen 501 is a screen related to a collection request function of the toner cartridge 130. A display 503 indicates a message requesting a user to select whether or not to execute the collection request of the toner cartridge 130. An icon 504 is an icon for executing the collection request of the toner cartridge 130, and an icon 505 is an icon for not executing the collection request of the toner cartridge 130. The user selects (presses) either the icon 504 or the icon 505.

In step S307, the CPU 111 serving as a determination unit determines whether or not it is necessary to collect the toner cartridge 130, based on which of the icon 504 and the icon 505 is selected. In a case where the icon 504 is selected, the CPU 111 determines that it is necessary to collect the toner cartridge 130, and advances the processing to step S308. In a case where the icon 505 is selected, the CPU 111 determines that the toner cartridge 130 does not need to be collected, and ends the processing shown in FIG. 3.

Figure 4:
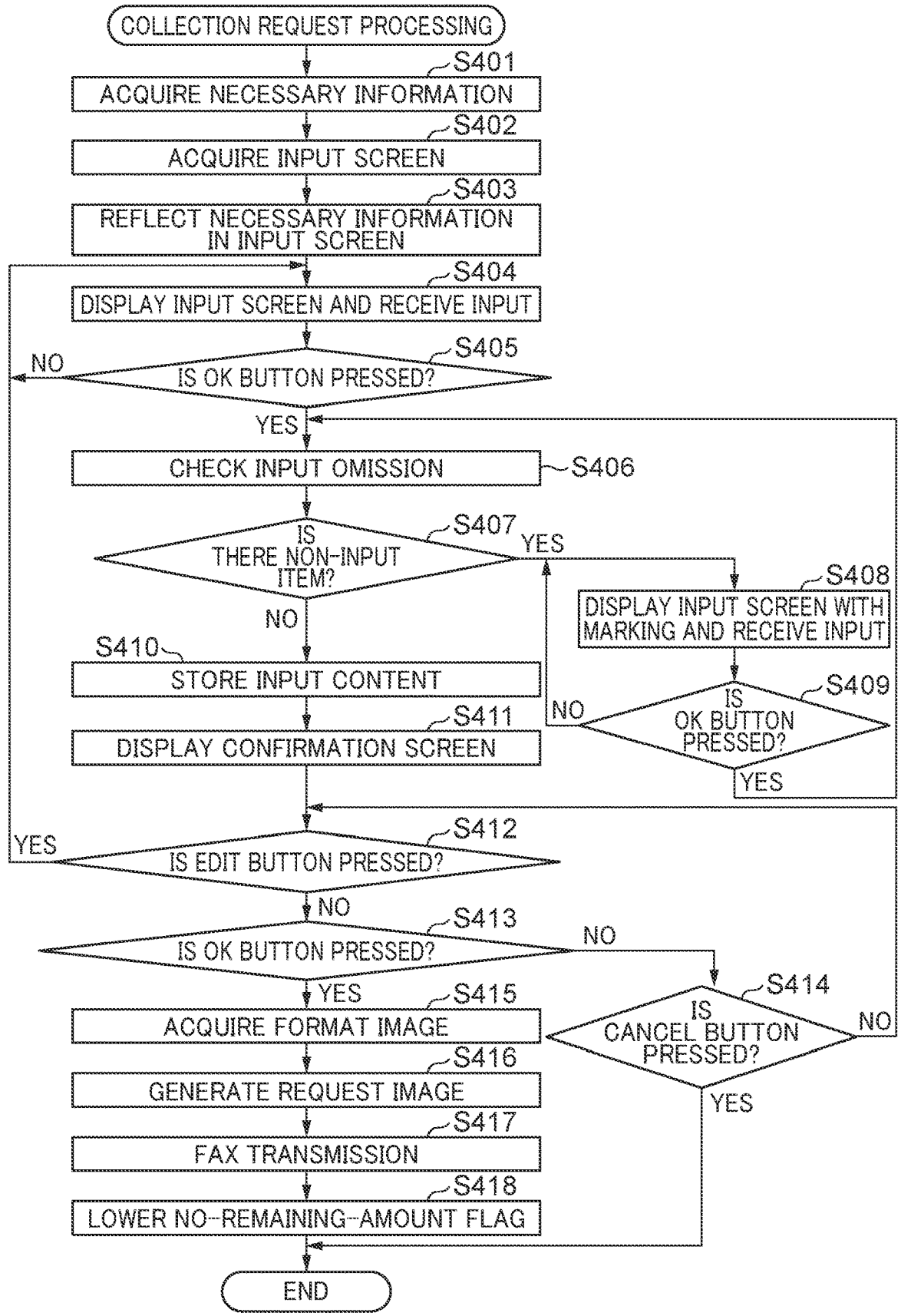
FIG. 4 is a flowchart showing collection request processing.

In step S308, the CPU 111 executes the collection request processing shown in FIG. 4, and ends the processing shown in FIG. 3. In step S309, the CPU 111 determines whether or not the "no-remaining-amount flag" stored in the RAM 113 is set (is set to "1"). As a result of the determination in step S309, in a case where the no-remaining-amount flag is set in the RAM 113, the CPU 111 advances the processing to step S310, and in a case where the no-remaining-amount flag is not set, the CPU 111 ends the processing shown FIG. 3.

In step S310, the CPU 111 lowers the no-remaining-amount flag (set to "0"), and ends the processing shown in FIG. 3. It should be noted that, when a predetermined time has elapsed after the consumable management processing ends, the consumable management processing may be started again to execute the processing of step S301 and subsequent steps. Alternatively, immediately after the consumable management processing ends, the consumable management processing may be started again to execute the processing of step S301 and subsequent steps.

It should be noted that the validity/invalidity of the collection request proposal function may be configured to be able to be designated by a user operation. In this case, the consumable management processing (FIG. 3) may be executed on condition that the collection request proposal function is designated as valid.

FIG. 4 is a flowchart showing the collection request processing executed in step S308 of FIG. 3.

In step S401, the CPU 111 serving as an acquisition unit acquires information (hereinafter referred to as "necessary information") necessary for requesting collection of a consumable. The necessary information is stored in the ROM 112 or the RAM 113. The necessary information acquired here does not need to include all the necessary information. The necessary information acquired here includes at least user information and destination information (these pieces of information are referred to as "first information"). The user information includes a company name, a name, a telephone number, an address, and the like. The destination information is, for example, a destination number of a FAX of a carrier to which collection is requested. In addition, the necessary information may include information on the number of toner cartridges 130 determined in step S303 to be in the state of "no remaining amount of toner". Further, the necessary information may include information such as a model of the MFP 101 and a model number of the toner cartridge 130.

In step S402, the CPU 111 acquires an input screen formatted for collection request. For example, the input screen is stored in the ROM 112 or the like in advance. Here, the input screen is not displayed on the operation part 116.

In step S403, the CPU 111 serving as a control unit reflects the necessary information acquired in step S401 on the input screen acquired in step S402. The method for the reflection is not particularly limited. For example, association information for associating each piece of necessary information and an input item in the input screen with each other is stored (held), in advance, in the ROM 112 or the like. Then, in step S403, when the input screen is displayed, each piece of necessary information may be reflected, based on the association information, so as to be input (included) and displayed in the corresponding input item (field) in the input screen.

In step S404, the CPU 111 displays the input screen in which the necessary information is reflected in step S403 on the operation part 116, and receives input/edit to the input item from the user.

Figure 6:
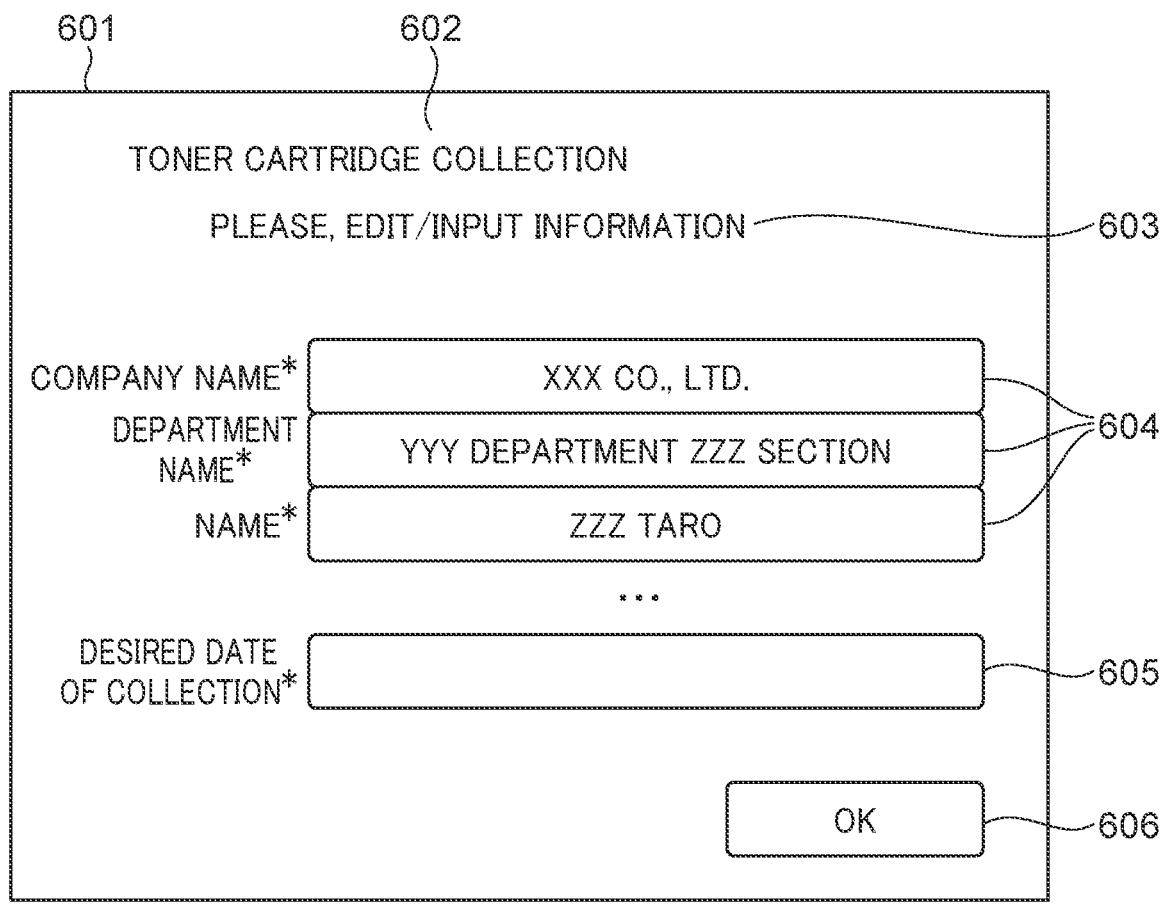
FIG. 6 is a diagram showing an example of an input screen reflecting necessary information.

FIG. 6 is a diagram showing an example of an input screen 601 reflecting necessary information. It should be noted that, in a case where the necessary information acquired in step S401 does not include some of all the necessary information, a non-input item (which is an input item (field) not filled in with information) is displayed on the input screen 601.

On the input screen 601, a display 602 indicates that the input screen 601 is a screen related to the collection request function of the toner cartridge 130. A display 603 indicates a message urging a user to input or edit the non-input item. A display 604 indicates the input item updated by the necessary information being reflected in step S403. A display 605 indicates an input item excluded from the target of reflection of the necessary information in step S403 (that is, indicates the non-input item). An icon 606 is an OK button, and is an icon to be pressed when the user completes the input and advances the request processing.

In step S405, the CPU 111 determines whether the icon 606 has been selected (pressed). In a case where the icon 606 is not selected, the CPU 111 returns the processing to step S404, and in a case where the icon 606 is selected, proceeds the processing to step S406. Therefore, the user can input information to the non-input item and/or edit information, on the screen 601 by operating the operation part 116 until the user presses the icon 606.

In step S406, the CPU 111 checks whether or not there is an input omission for each input item on the screen 601. That is, in step S407, the CPU 111 determines whether or not there is a non-input item. The CPU 111 advances the processing to step S410 in a case where there is no non-input item, and advances the processing to step S408 in a case where there is a non-input item. In step S408, the CPU 111 displays an input screen 701 (FIG. 7) with marking, on the operation part 116, and receives input/editing to the input item.

Figure 7:
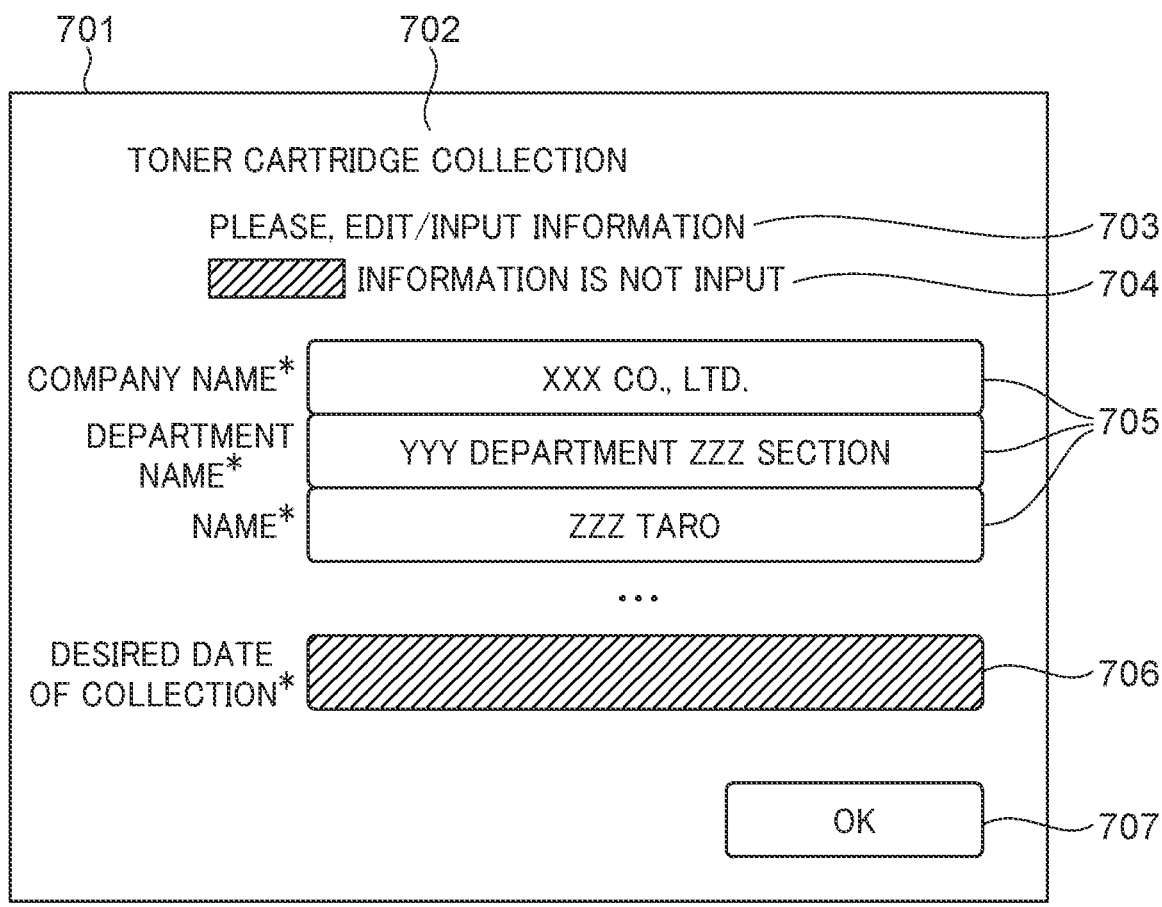
FIG. 7 is a diagram showing an example of an input screen with marking.

FIG. 7 is a diagram showing an example of the input screen 701 with marking. As shown in the input screen 701, marking is applied to a non-input item, by which the non-input item and filled input item can be distinguished. A display 702 indicates that the input screen 701 is a screen related to the collection request function of the toner cartridge 130. A display 703 is a message urging a user to make a new input to an input item and/or edit an input item. A display 704 indicates a message for making a user recognize a non-input item. A display 705 indicates the filled input item. A display 706 indicates the non-input item. An icon 707 is an OK button, and is an icon to be pressed when the user completes the input/editing and advances the request processing.

In step S409, the CPU 111 determines whether or not the icon 707 on the input screen 701 has been selected (pressed). The CPU 111 returns the processing to step S408 in a case where the icon 707 is not selected, and returns the processing to step S406 in a case where the icon 707 is selected. Therefore, until the user presses the icon 707, the user can input information to the non-input item and/or change (edit) an input content of the filled input item on the input screen 701, by operating the operation part 116.

In step S410, the CPU 111 stores the input content of each input item obtained by reflecting the input/editing in step S404 or S408, in the RAM 113. The input content stored here is "second information" for requesting collection of a consumable. In step S411, the CPU 111 displays a confirmation screen 801 (FIG. 8) in which the input content stored in the RAM 113 is reflected, on the operation part 116.

FIG. 8 is a diagram showing an example of the confirmation screen 801. On the confirmation screen 801, the latest content input/edited so far is reflected. By referring to the confirmation screen 801, the user can confirm the content input in step S404 and/or S408.

On the confirmation screen 801, a display 802 indicates that the confirmation screen 801 is a screen related to the collection request function of the toner cartridge 130. A display 803 indicates a message urging a user to determine whether or not to make a collection request with each displayed information. A display 804 indicates a current input item, and this input item is normally filled in. An icon 805 is an OK button, and is an icon to be pressed by the user to instruct the collection request. An icon 806 is an edit button, and is an icon for re-editing to shift, when selected, the processing to the re-editing of the input content. An icon 807 is a cancel button, and is an icon to be pressed by the user to stop the collection request processing.

In step S412, the CPU 111 determines whether or not the icon 806 on the confirmation screen 801 has been selected (pressed). The CPU 111 returns the processing to step S404 in a case where the icon 806 is selected, and advances the processing to step S413 in a case where the icon 806 is not selected.

In step S413, the CPU 111 determines whether or not the icon 805 on the confirmation screen 801 has been selected (pressed). Selection of the icon 805 means reception of a collection request transmission instruction from the user. The CPU 111 advances the processing to step S415 in a case where the icon 805 is selected, and advances the processing to step S414 in a case where the icon 805 is not selected.

In step S414, the CPU 111 determines whether the icon 807 on the confirmation screen 801 has been selected (pressed). The CPU 111 ends the processing shown in FIG. 4 in a case where the icon 807 is selected, and returns the processing to step S412 in a case where the icon 807 is not selected.

As described above, in steps S404 to S414, the CPU 111 receives, from the user, the supplement (input) of the information necessary for the consumable collection request and/or the edit of the already input information, via the input screens 601, 701, and 801, and updates each information. As a result, the CPU 111 serving as a generation unit generates the second information for requesting collection of a consumable. The second information includes an input content input afterwards, in addition to the first information including the user information and the destination information. In a case where the first information or the information input afterwards is modified (edited), the second information includes the latest input content (the latest information) related thereto.

In step S415, the CPU 111 acquires a format image 901 for collection request (FIG. 9).

FIG. 9 is a diagram showing an example of the format image 901 for collection request. The format image 901 is stored in the ROM 112 or the RAM 113. It should be noted that the format image 901 may be stored in advance, or information for generating the format image 901 may be stored, and the format image 901 may be generated based on the information. It should be noted that the format image 901 is assumed to be RAW data, but is not limited thereto.

In the format image 901, a display 902 indicates that the format image 901 is an image (image data) for a collection request. A display 903 indicates an item name of information, and in FIG. 9, displays 903 including items such as a company name, a department name, a name of a person in charge, a telephone number, a FAX number, and an address are lined up. A display 904 is an input field for filling in an input content corresponding to each item. A display 905 is an item name indicating an item on the desired collection date, and a display 906 is an input field of the desired collection date. A display 907 is an item name indicating an item of the number of used toner cartridges 130 to be collected, and a display 908 is an input field of the number of toner cartridges 130 to be collected. It should be noted that the input fields of the display 904, the display 906, and the display 908 are blank at the time of execution of step S415.

In step S416, the CPU 111 generates an image for request (hereinafter referred to as "request image") 1001 (FIG. 10). Specifically, the CPU 111 reads the input content of each input item stored in the RAM 113 in step S410. Further, the CPU 111 generates the request image 1001 which is a superimposed image, by superimposing the read input content on the format image 901.

FIG. 10 is a diagram showing an example of the request image 1001. It should be noted that, as a specific method for realizing the superimposed image, in a case where the format image 901 is RAW data, the request image 1001 may be generated by the input content being superimposed as it is on the format image 901. In a case where the format image 901 is not the RAW data, the input content may be superimposed on the format image 901 after the format image 901 is converted into the RAW data. Furthermore, as a method for realizing the superimposed image, it is conceivable that the CPU 111 stores position information of superimposition for each input content in the RAM 113 in advance, and superimposes in step S416 each input content on the format image 901 based on the stored position information; however, the method for realizing the superimposed image is not limited to this method.

In the request image 1001, displays 1002, 1003, 1005, and 1007 are similar to the displays 902, 903, 905, and 907 in the format image 901 (FIG. 9), respectively. In displays 1004, 1006, and 1008, input contents are filled in by being superimposed on the format image 901.

In step S417, the CPU 111 serving as a transmission unit uses the destination number of the FAX, which is acquired in step S401 as a transmission destination (designated destination), to perform FAX transmission of the request image 1001 to the transmission destination via the public line 102. Therefore, in the present embodiment, the second information for requesting collection of a consumable is transmitted by FAX in the form of the request image 1001 (FIG. 10) which is the superimposed image.

It should be noted that, instead of acquiring the destination number of the FAX in step S401, the input of the destination number may be received from the user via the operation part 116. Further, the destination number acquired in step S401 may be changeable by a user's input. From this viewpoint, it is not essential that the destination information is included in the first information.

It should be noted that the request image 1001 may be displayed as a preview before the FAX transmission of the request image 1001. In this case, the FAX transmission of the request image 1001 may be configured to be canceled after the preview are displayed.

It should be noted that, in addition to or instead of FAX transmission of the request image 1001, the request image 1001 may be printed on paper. In such a case, it is possible to add handwriting by the user, so that the user may perform FAX transmission using the paper after the addition of handwriting.

In step S418, the CPU 111 lowers the no-remaining-amount flag in the RAM 113 (sets to "0"), and ends the processing shown in FIG. 4.

According to the present embodiment, in a case where it is determined that the consumable (toner cartridge 130) needs to be collected, the CPU 111 acquires the first information including the user information and the destination information as the necessary information, and displays the input screen 601 in which the first information is reflected. The CPU 111 receives supplement (additional input) and/or edit of the necessary information from the user on the displayed screen (input screens 601, 701, and 801), thereby generating the second information for requesting collection of a consumable. The CPU 111 generates the request image 1001 (FIG. 10) by superimposing the second information on the format image 901, and transmits the request image 1001 by FAX to a destination indicated by the destination information.

According to this processing, the user only needs to additionally input the necessary information other than the first information, and only needs to fill in the non-input item and/or modify (edit) the filled input item as a main necessary work. Therefore, even in an environment where the consumption state of a consumable cannot be shared with a collection request destination, the collection of the consumable can be requested without requiring complicated work.

In addition, the CPU 111 monitors the consumption state of the consumable and displays the collection proposal screen 501 (FIG. 5) in a case of determining that the consumable has been consumed (S306), which makes it possible to propose collection at an appropriate timing. In addition, the CPU 111 determines that the consumable needs to be collected in response to receiving a user's instruction to request collection of the consumable (pressing of the icon 504) on the collection proposal screen 501 (S307), which makes it possible to determine the necessity of collection in accordance with the intention of the user.

In addition, the CPU 111 marks a non-input item among items corresponding to information necessary for requesting collection of the consumable on the input screen 601, so that a user can easily recognize the non-input item. Therefore, when the user is urged to input, the user can easily determine an item portion required to be input. It should be noted that a display manner for recognizing the non-input item is not limited to marking, and the display manner may be any manner as long as the display manner makes a user to recognize the non-input item, such as a display manner displaying the non-input item in a display manner different from that for the filled input item. For example, only the non-input item may be differed in color or be blinked.

A second embodiment is different from the first embodiment in the collection request processing, and other configurations are similar to those of the first embodiment.

Figure 11:
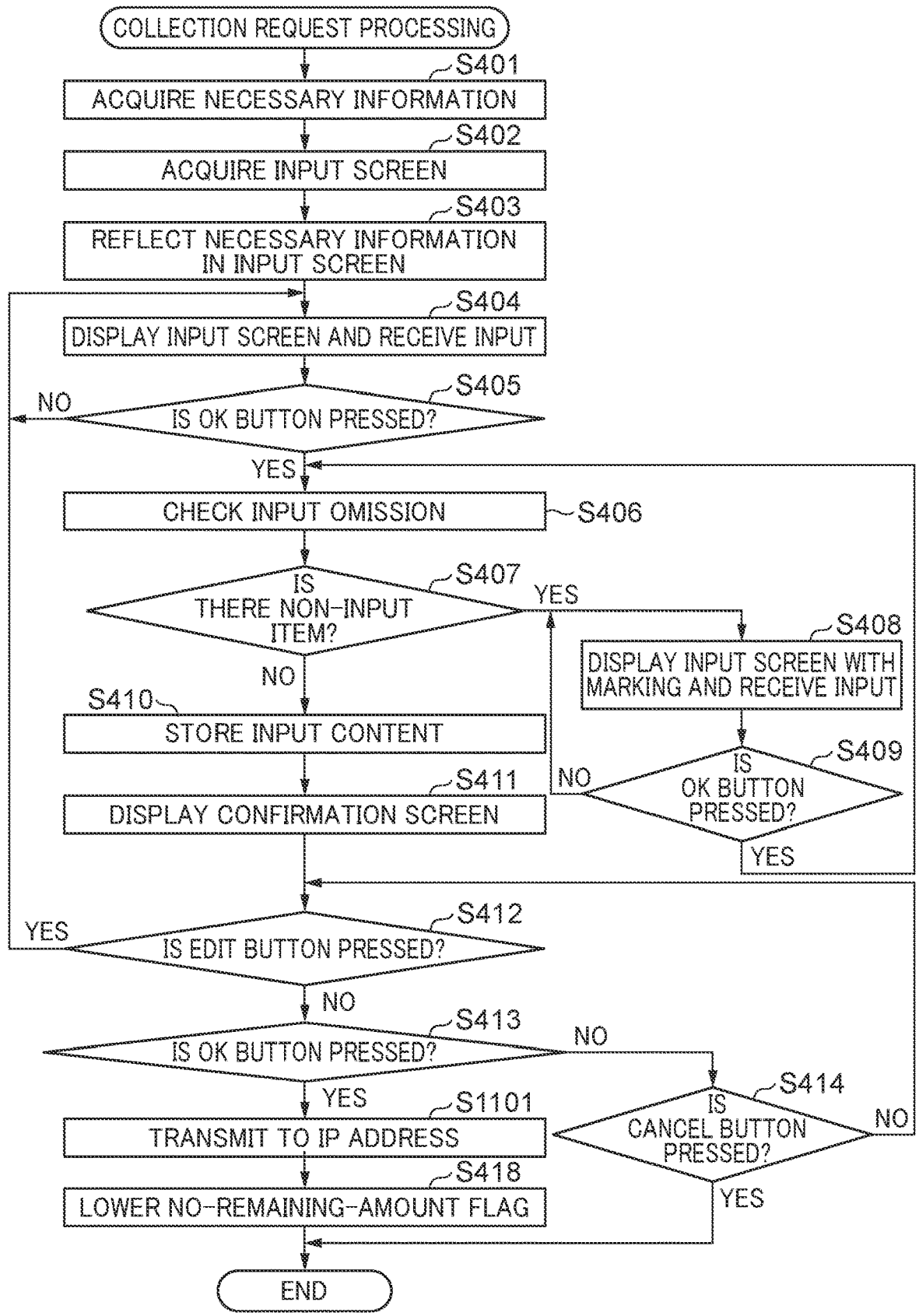
FIG. 11 is a flowchart showing collection request processing (second embodiment).

FIG. 11 is a flowchart showing collection request processing executed in step S308 of FIG. 3, in the second embodiment. In FIG. 11, the same processing as that of the first embodiment (FIG. 4) is denoted by the same step number. In the present embodiment, information for collection request is transmitted to a server of a carrier.

In the present embodiment, the destination information included in the necessary information acquired in step S401 is, for example, an IP address of the server of the carrier to which the collection is requested. The CPU 111 performs processing of steps S401 to S413 similar to those of the first embodiment. In a case of determining, in step S413, that the icon 805 on the confirmation screen 801 has been selected (pressed), the CPU 111 advances the processing to step S1101. Otherwise, the CPU 111 advances the processing to step S414 which is similar to that of the first embodiment.

In step S1101, the CPU 111 reads an input content (second information) stored in step S410 from the RAM 113. Further, the CPU 111 transmits the read input content using the network 103 to the IP address acquired in step S401 as a transmission destination. Therefore, in the present embodiment, the second information for requesting collection of a consumable is transmitted in the form of transmission data. After step S1101, the CPU 111 executes processing of step S418 similar to that of the first embodiment.

It should be noted that, instead of acquiring the IP address of the server of the carrier in step S401, an input of the IP address may be received from a user via the operation part 116. Further, the IP address acquired in step S401 may be changeable by a user's input. From this viewpoint, it is not essential that the destination information is included in the first information.

According to the present embodiment, the second information is generated similarly to the first embodiment. Further, the CPU 111 transmits the second information to the IP address indicated by the destination information. Therefore, even in an environment where the consumption state of a consumable cannot be shared with a collection request destination, it is possible to obtain an effect similar to that of the first embodiment, regarding requesting collection of the consumable without complicated work.

It should be noted that, in the present embodiment, a configuration in which an input content is transmitted to a server is adopted; however, the present invention is not limited thereto. For example, a configuration can be adopted, in which the destination information includes a mail address of a transportation company, and in step S1101, an input content is transmitted by mail to the mail address indicated by the destination information.

A third embodiment is different from the first embodiment in the consumable management processing, and other configurations are similar to those of the first embodiment. However, in the present embodiment, it is assumed that a plurality of the toner cartridges 130 is used in the image processing apparatus 101.

Figure 12:
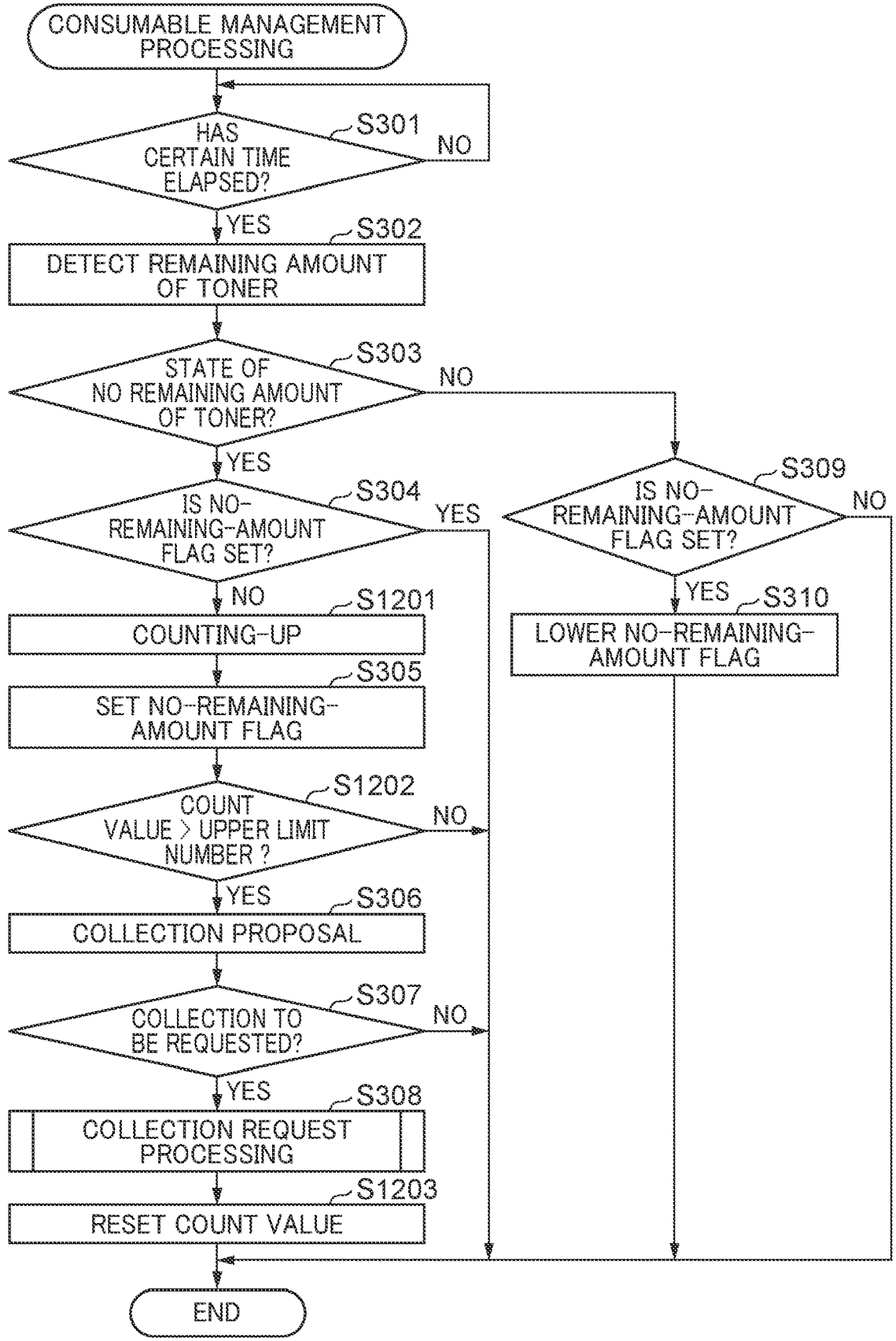
FIG. 12 is a flowchart showing consumable management processing (third embodiment).

FIG. 12 is a flowchart showing consumable management processing. An execution subject and a start condition of this processing are similar to those of the consumable management processing shown in FIG. 3. In FIG. 12, the same processing as that of the first embodiment is denoted by the same step number. In the consumable management processing shown in FIG. 12, processing in steps S1201, S1202, and S1203 are added to the consumable management processing shown in FIG. 3.

The CPU 111 performs processing in steps S301 to S304 similar to that of the first embodiment. In a case where it is determined in step S304 that the no-remaining-amount flag is not set, the CPU 111 advances the processing to step S1201. Otherwise, the CPU 111 ends the processing shown in FIG. 12 as in the first embodiment. In step S1201, the CPU 111 increments a count value for counting the number of toner cartridges 130 in the state of "no remaining amount of toner". It should be noted that this count value is reset to 0 at the start of the processing shown in FIG. 12. The latest count value is stored in the RAM 113.

After step S1201, the CPU 111 executes step S305 similar to that of the first embodiment, and advances the processing to step S1202. In step S1202, the CPU 111 reads the current count value from the RAM 113, and determines whether or not the count value exceeds an upper limit number, that is, whether or not (count value)>(upper limit number) is satisfied. Information on the upper limit number is stored, in advance, in the ROM 112 or the like. It should be noted that a method for setting the upper limit number is not limited, and the upper limit number may be configured to be settable by a user afterwards.

Then, in a case where the count value does not exceed the upper limit number, the CPU 111 ends the processing shown in FIG. 12. In a case where the count value exceeds the upper limit number, the CPU 111 advances the processing to step S306, and performs the processing in steps S306 and S307 similar to that of the first embodiment and performs the processing in step S308.

After step S308, in step S1203, the CPU 111 resets the count value to 0, and ends the processing shown in FIG. 12. It should be noted that, when a predetermined time has elapsed after the consumable management processing ends, the consumable management processing may be started again to execute the processing of step S301 and subsequent steps. Alternatively, immediately after the consumable management processing ends, the consumable management processing may be started again to execute the processing of step S301 and subsequent steps.

According to the present embodiment, even in an environment where the consumption state of the consumable cannot be shared with a collection request destination, it is possible to obtain an effect similar to that of the first embodiment, regarding requesting collection of the consumable without complicated work.

In addition, the collection proposal screen (FIG. 5) is displayed in a case where the number of consumables determined to be consumed exceeds the upper limit number, which makes it possible to propose the collection of a consumable to a user at an appropriate timing.

It should be noted that, in the present embodiment, the collection request processing executed in step S308 may be the processing shown in FIG. 4 (first embodiment) or the processing shown in FIG. 11 (second embodiment).

It should be noted that, in the present embodiment, the toner cartridge 130 which was used in the MFP 101 in the past and is present outside the MFP 101 may also be included in the toner cartridge 130 in the state of "no remaining amount of toner". In this case, in step S1201, the number of toner cartridges 130 in the state of "no remaining amount of toner" existing outside the MFP 101 is also counted. Further, the CPU 111 automatically inputs a count value to the display 1008 of the request image 1001 (FIG. 10). As a result, it is not necessary for a user to input the number of toner cartridges 130 to be collected, and labor is simplified.

It should be noted that the consumable in the present invention is not limited to the toner cartridge, and may be a photosensitive drum developing unit or the like.

It should be noted that the screens 601, 701, and 801 may be displayed on a screen on a web form.

It should be noted that execution of the transmission in steps S417 and S1101 may be instructed by a request via an application in a smartphone or a screen on a cloud service, in addition to the request on the web form.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-116288, filed Jul. 21, 2022, which is hereby incorporated by reference wherein in its entirety.

What is claimed is:
1. An image processing apparatus comprising:
a printing device that uses a consumable to form an image on a sheet;
a display device;
at least one memory that stores a set of instructions; and
at least one processor that executes the instructions to:
display a collection proposal screen on the display device, the collection proposal screen including:
a first icon selectable by a user to execute a physical collection request that requests a collecting service to physically collect the consumable that has been used; and
a second icon selectable by the user to not execute the physical collection request;
determine whether or not physical collection of the consumable is necessary based on the first or second icon being selected by the user;
acquire, in a state where the physical collection of the consumable is determined to be necessary, user information as information necessary for the physical collection request of the consumable by display- ing on the display device an input screen where the acquired user information is input or edited by the user and displayed;

generate a request image for the physical collection request of the consumable, from the received information necessary for the physical collection request of the consumable and a format image for the physical collection request; and transmit the generated request image to a designated destination.

2. The image processing apparatus according to claim 1, wherein the at least one processor executes the instructions to further transmit, by FAX, the generated request image to the designated destination.

3. The image processing apparatus according to claim 1, wherein the user information includes destination information indicating the designated destination.

4. The image processing apparatus according to claim 1, wherein the at least one processor executes the instructions to further:

monitor a consumption state of the consumable; and display the collection proposal screen in a state where the consumable is determined to be consumed.

5. The image processing apparatus according to claim 4, wherein:

the consumable is a toner cartridge that contains toner, and the toner cartridge is determined to be consumed in a state where a remaining amount of the toner contained in the toner cartridge is below a predetermined value.

6. The image processing apparatus according to claim 1, wherein:

the consumable includes a plurality of consumable components, and the at least one processor executes the instructions to further:

monitor a consumption state of each of the plurality of consumable components; and display the collection proposal screen in a state where the number of consumable components, among the plurality of consumable components, determined to be consumed exceeds an upper limit number.

7. The image processing apparatus according to claim 6, wherein:

each of the plurality of consumable components is a toner cartridge that contains toner, and the toner cartridge is determined to be consumed in a state where a remaining amount of the toner contained in the toner cartridge is below a predetermined value.

8. The image processing apparatus according to claim 1, wherein the at least one processor executes the instructions to further, in a state where a non-input item, among items corresponding to the information necessary for the collection request of the consumable on the input screen, display the non-input item in a display manner different from a display manner of a filled input item, to notify regarding the non-input item.

9. The image processing apparatus according to claim 1, wherein the at least one processor executes the instructions to further transmit the request image in response to reception of a collection request transmission instruction from the user.

10. The image processing apparatus according to claim 1, wherein the consumable is a toner cartridge that contains toner.

11. The image processing apparatus according to claim 1, wherein the at least one processor executes the instructions to further display a preview of the request image before transmitting the request image by FAX.

12. The image processing apparatus according to claim 1, wherein the image processing apparatus is an MFP.

13. The image processing apparatus according to claim 12, wherein the user information includes a desired collection date and an address where the consumable is to be collected on the desired collection date.

14. A method of controlling an image processing apparatus that includes a printing device that uses a consumable to form an image on a sheet and a display device, the method comprising:

displaying a collection proposal screen on the display device, the collection proposal screen including:

a first icon selectable by a user to execute a physical collection request that requests a collecting service to physically collect the consumable that has been used; and a second icon selectable by the user to not execute the physical collection request;

determining whether or not physical collection of the consumable is necessary based on the first or second icon being selected by the user;

acquiring, in a state where the physical collection of the consumable is determined to be necessary, user information as information necessary for the physical collection request of the consumable by displaying on the display device an input screen where the acquired user information is input or edited by the user and displayed;

generating a request image for the physical collection request of the consumable, from the information necessary for the physical collection request of the consumable and a format image for the physical collection request; and transmitting the generated request image to a designated destination.

15. The method according to claim 14, wherein the image processing apparatus is an MFP.

16. The method according to claim 15, wherein the user information includes a desired collection date and an address where the consumable is to be collected on the desired collection date.

17. A computer-readable non-transitory storage medium storing a program executable by a computer of an image processing apparatus, including a printing device that uses a consumable to form an image on a sheet and a display device, to execute a method comprising:

displaying a collection proposal screen on the display device, the collection proposal screen including:

a first icon selectable by a user to execute a physical collection request that requests a collecting service to physically collect the consumable that has been used; and a second icon selectable by the user to not execute the physical collection request;

determining whether or not physical collection of the consumable is necessary based on the first or second icon being selected by the user;

acquiring, in a state where the physical collection of the consumable is determined to be necessary, user information as information necessary for the physical collection request of the consumable by displaying on the display device an input screen where the acquired user information is input or edited by the user and displayed;

generating a request image for the physical collection request of the consumable, from the information necessary for the physical collection request of the consumable and a format image for the physical collection request; and transmitting the generated request image to a designated destination.

18. The computer-readable non-transitory storage medium according to claim 14, wherein the image processing apparatus is an MFP.

19. The computer-readable non-transitory storage medium according to claim 18, wherein the user information includes a desired collection date and an address where the consumable is to be collected on the desired collection date.

* * * * *